Jan. 27, 1959 J. B. HOWARD 2,871,217
METHOD FOR THE REACTION OF POLYGLYCIDYL COMPOUNDS
WITH ORGANIC POLYSULFIDES
Filed May 23, 1956
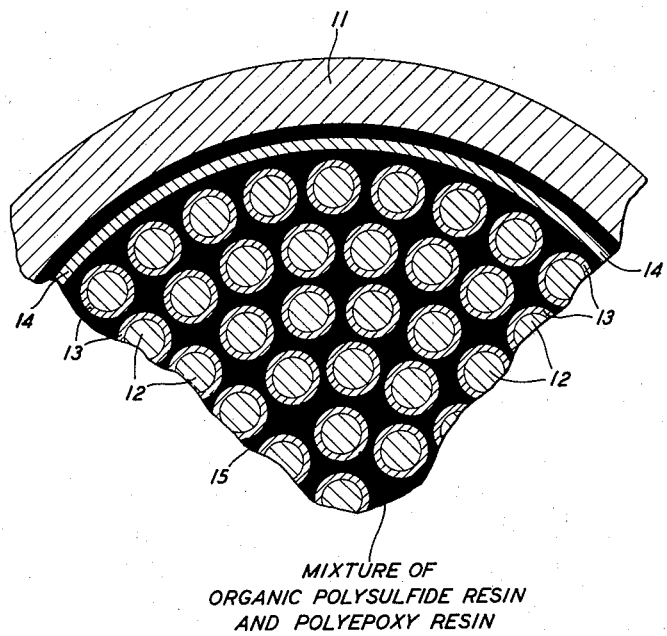
MIXTURE OF
ORGANIC POLYSULFIDE RESIN
AND POLYEPOXY RESIN
INVENTOR
J. B. HOWARD
BY
ATTORNEY United States Patent Office 2,871,217
Patented Jan. 27, 1959

2,871,217

METHOD FOR THE REACTION OF POLYGLY-CIDYL COMPOUNDS WITH ORGANIC POLY-SULFIDES

John B. Howard, Summit, N. J., assignor to Bell Telephone Laboratories, Incorporated, New York, N. Y., a corporation of New York Application May 23, 1956, Serial No. 586,711

3 Claims. (Cl. 260—42)

This invention relates to an improved method of catalyzing reactions between polyepoxy compounds and organic polysulfide compounds.

Although of broader application, this method is particularly suited for forming gas-tight cable plugs from mixtures of polyepoxy compounds and organic polysulfide compounds by catalysis of gel-forming reactions between these compounds.

The application is a continuation-in-part of the copending application of J. B. Howard, Serial No. 490,693, filed February 25, 1955, now abandoned.

The gelatinous semi-solid structures formed by the reaction of certain polyepoxy compounds, particularly polyglycidyl ethers, with certain polyalkylene polysulfides or polyalkylene ether polysulfides have shown great usefulness as gas-tight plugs for use in cables or electrical conduits in which a pressure greater than atmospheric is maintained in order to inhibit leakage of moisture into the cable or conduit. The technique of forming such cable plugs is described in the copending United States application for patent of R. C. Platow, which application has Serial No. 304,537, filed August 15, 1952, now U. S. Patent No. 2,792,441, granted May 14, 1957.

As described in the application and patent of R. C. Platow mentioned above, a gas-tight plug can be easily installed in an electrical cable by making a small opening in the cable sheath and injecting a fluid resin therethrough. The fluid permeates the cable core in the region of the opening and impregnates the insulation which covers wires within the cable. The fluid resin sets in a reasonable time to form a rubbery resilient solid material capable of withstanding the internal gas pressures within the cable, usually on the order of 10 pounds per square inch. The opening in the sheath can be resealed, after injection of the resin, by a suitable mechanical seal.

To bring about the gelation of the injected fluid materials used to form the plug, the reactants have heretofore had an alkaline catalyst added thereto. The alkaline catalysts heretofore used have generally been amines, either primary, secondary or tertiary. Monoamines, diamines and triamines have all been used including dimethylamine, trimethylamine, triethylamine, diethylene triamine, and ethylene diamine.

Though effective as catalysts for the desired gelation reaction between polyepoxy and polysulfide compounds, one characteristic of alkaline materials, such as amines, which influence their use in forming cable plugs, is their ability to catalyze the polymerization of polyepoxy compounds alone in the absence of the polysulfide component. Thus, to prevent premature reaction and gelling, such basic catalysts are usually dissolved or dispersed in the polysulfide compound, on which the catalyst has little or no effect. Polymerization then occurs only at the time the polyepoxy material and the mixture of basic catalyst and polysulfide are commingled, immediately prior to injection into the cable for the purposes of plug formation.

In the present invention, an improved method of catalyzing the gelation reaction makes use of catalysts non-alkaline in character which are specific for the interaction of the polyepoxy reactants and the polysulfide. The catalysts have no appreciable catalytic effect on either of the components separately. The catalysts are, thus, adaptable to admixture with either or both of the separate reactants prior to use. This property of specificity possessed by the new catalysts offers the advantage, inter alia, of lending greater flexibility to the operations of storing, shipping, and compounding the materials eventually to be used for cable plug formation. Also, by adding some catalyst to both reactants before mixing, an effective dispersion of the catalyst can be obtained without a need for excessive mixing of the reactants.

The catalysts sought for thickening the organic mixtures used for cable plugging should have properties other than chemical efficacy alone. Thus, catalytic reactivity should be appreciable at room temperature so that gelation will be completed at the end of 18 to 24 hours. However, reactivity is not to be so pronounced that no time remains for manipulation of the liquid reactants once mixed. Because of their use in cable plugs and the requirement that these plugs be gas-tight, the reactant mixtures should maintain fluidity for some period, about 4 to 6 hours, after insertion into the cable. This will allow adequate penetration of porous paper insulation which usually covers the wires in the cable. The catalysts should not attack metals used in the cable sheath or the wires therein, and ought, preferably, to have sufficient dielectric strength to maintain proper insulation. The catalytic effect on the gelling materials is to be such that the resulting plugs are sturdy but flexible. The gels should maintain gas-retentive properties and resistance to tearing for long periods of time after their formation. Lastly, the chemicals should preferably not be toxic nor act as skin irritants.

In the accompanying drawing, a section of a plugged cable sheath is shown. The sheath 11, such as of metal, surrounds a cable core made up of a plurality of wires 12, each covered with a fibrous insulation, such as of paper pulp, wound paper, or similar material 13. The entire core may be further wrapped in another wrapping 14, preferably of paper. Rubbery solid plugging material 15 has been formed in interstices between wires 12, between sheath 11 and wrapping 14 surrounding the core, and between wrapping 14 and the core composed of insulated wires 12 by the injection through cable sheath 11 of a polyepoxy-polysulfide resin mixture and catalyst for its gelation.

The catalysts suggested herein for use in the improved method of interreacting polyepoxy compounds and polysulfide compounds are thiuram sulfides, thiazyl sulfides, thio salts formed by combination of thiuram or thiazyl radicals with certain divalent elements through a sulfur linkage, and mixtures of two or more of the compounds just specified.

By the term "thiuram sulfide" is meant, as understood in the art, a compound with the formula

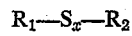

in which $R_2$ is a thiuram radical with the formula

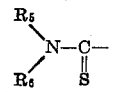

and $R_1$ may be a thiuram radical, or hydrogen, and $x$ has the value 1, 2 or 4.

By the term "thiazyl sulfide" is meant, as understood in the art, a compound with the formula $$R_1-S_x-R_2$$

in which $R_1$ is a thiazyl radical with the formula

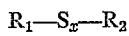
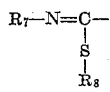

$R_1$ may be a thiazyl radical, or hydrogen, and $x$ has the value 1, 2 or 4.

By the term "thio salt formed by combination of thiuram or thiazyl radicals with certain divalent elements through a sulfur linkage" is meant a compound with the formula $$R_2-S-M-S-R_2'$$

in which $R_2$ and $R_2'$ are either thiuram radicals or thiazyl radicals with the formulas given earlier for these species, and M is zinc, lead, or selenium.

In the formulas given above for the thiuram and thiazyl radicals, $R_5$, $R_6$, $R_7$ and $R_8$ may be substituted or unsubstituted alkyl or aryl groups. Those groups containing 6 or fewer carbon atoms show particular effectiveness. Among the alkyl groups, methyl and ethyl groups are radicals giving compounds especially preferred. The groups $R_5$ and $R_6$, or $R_7$ and $R_8$, may also be constructed as being included within a single cyclic group. For example, $R_5$ and $R_6$ may be terminal carbon atoms in a pentamethylene chain, forming, with nitrogen, a saturated 6-membered heterocyclic system.

Similarly $R_7$ and $R_8$ may be terminal members of a dimethylene chain, or carbon atoms in an o-phenylene radical, forming thiazoline and benzothiazole ring systems from the thiazyl group, respectively.

As illustrative of the thiuram sulfides, thiazyl sulfides, and thio salts of thiuram and thiazyl radicals mentioned above, the following specific compounds are given. The compounds shown as illustrative examples have shown particular utility as catalysts for the reaction between polyepoxy and polysulfide compounds, but are not to be deemed as limiting either the number or variety of suitable catalysts broadly described above.

2-mercaptothiazoline — a thiazyl monosulfide for which $R_1=H$, while $R_7$ and $R_8$ are terminal members of a dimethylene group.

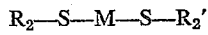

Tetramethylthiuram monosulfide—a thiuram monosulfide for which $R_1=R_2$ and $R_5$, $R_6$ are methyl groups. $x$ is equal to one.

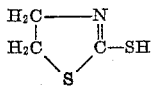

Tetramethylthiuram disulfide—$R_1=R_2$, and $R_5$ and $R_6$ are methyl groups. $x$ is equal to 2.

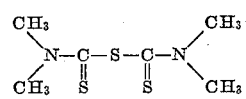

Tetraethylthiuram disulfide—$R_5$ and $R_6$ are both ethyl radicals.

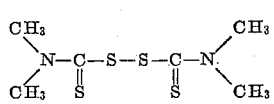

Mercaptobenzothiazole—a thiazyl monosulfide corresponding to the substitution $R_1=H$. $R_7$ and $R_8$ are members of the same phenylene group.

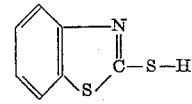

Dipentamethylenethiuram tetrasulfide—a thiuram tetrasulfide having $R_1=R_2$. $R_5$ and $R_6$ are terminal members of a pentamethylene chain. $x$ is equal to four.

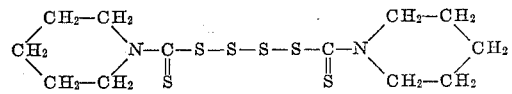

Benzothiazyl disulfide—a thiazyl disulfide in which $R_1=R_2$ and $R_7$ and $R_8$ are in the same aryl radical.

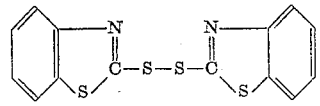

Lead dimethyldithiocarbamate—a thio salt of lead and thiuram radicals for which $R_5$ and $R_6$ are methyl.

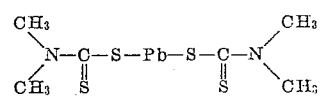

Zinc dimethyldithiocarbamate—a zinc thio salt containing the dimethyl thiuram radical.

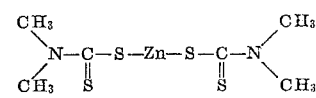

Selenium diethyldithiocarbamate—a diethyl thiuram thio salt of selenium.

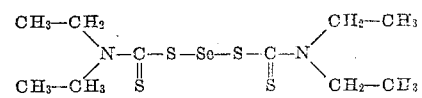

Zinc salt of 2-mercaptobenzothiazole—thio salt of zinc and thiazyl radicals, in which latter $R_7$ and $R_8$ are members of the same aryl group.

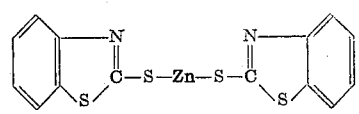

Selenium salt of 2-mercaptobenzothiazole—a thio salt formed by combination of thiazyl radicals and selenium through a sulfur linkage.

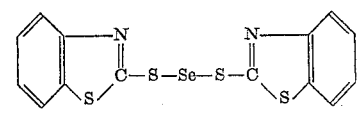

Lead salt of 2-mercaptothiazoline—a thio salt containing lead in combination with thiazyl radicals.

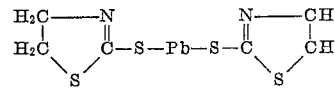

A mixture of 20 weight percent tetraethylthiuram disulfide and 80 weight percent tetramethylthiuram disulfide has shown particular usefulness as a catalytic agent. As in the case of the mixture just mentioned, the solubility of mixed catalysts in the liquid reactants is often greater than the solubility of equivalent amounts of the component pure catalyst compounds used singly. Such increased solubility of the mixed catalysts may be reflected in an increased catalytic efficacy for mixtures. Because of their higher solubility and greater catalytic action, which result in more rapid gelation of reactants, mixed catalysts are often preferred to an equivalent amount of a single catalyst.

Some of the compounds mentioned above, here taught as catalysts, have found other uses as blending agents or softening compounds in other compositions. For example, the patent granted February 28, 1950 to Hans Paul Wagner, No. 2,498,931, describes the use of nitrogen substituted dithiocarbamates as blending agents for mixtures of "sulfur-sulfide gums" with synthetic copolymers of butadiene and vinyl compounds. Similarly, the patent to Joseph C. Patrick, No. 2,206,642, granted July 2, 1940, mentions the use of tetramethylthiuram disulfide as a plasticizer and softener for rubber-like compositions formed by reacting an alkaline polysulfide with an organic compound having halogen or other negative radicals on two terminal carbon atoms.

Such use of dithiocarbamates and of tetramethylthiuram disulfide as blending agents, plasticizers or softeners with rubber-like compositions is distinct from use of the broad class of compositions mentioned previously as catalytic agents for promoting the copolymerization of materials as chemically disparate as the organic polysulfides and the polyepoxide compounds discussed below. The catalysts, in this new use, promote a gelation—a hardening—rather than performing a softening or plasticizing function. The presence of the catalysts is not required to "blend" other components, which are miscible and compatible in its absence. The chemical properties of the catalysts, not their physical properties, are of paramount interest. In addition, as mentioned, the catalysts have no noticeable effect on either of the separate reactants with which they are here used. The catalysts are active and specific only for mixtures of organic polysulfides and polyepoxides, as considered further below.

The plug forming mixtures for which the catalysts can be used usually contain two components, a liquid organic polysulfide and a liquid polyepoxide. The liquid organic polysulfides used in the mixtures are known in the art and may be prepared as described in United States Patent No. 2,402,977, issued July 2, 1946 to J. C. Patrick and H. R. Ferguson. The polysulfides are compounds comprising a plurality of organic hydrocarbon radicals linked through sulfur atoms, or in the case of polyalkylene ether polysulfides, through oxygen atoms and sulfur atoms. The chains in both cases are terminated by mercapto groups. The chains, however, may also contain additional mercapto groups in nonterminal positions, providing opportunity for crosslinking reactions. In each case, the chains will have at least two mercapto groups per molecule.

As described in United States Patent No. 2,042,977, the organic polysulfide compounds are formed by reaction of an inorganic alkaline polysulfide and alkaline hydrosulfide mixture with organic compounds having two or more carbon-attached negative radical substituents, commonly chlorine atoms, capable of removal by reaction with the inorganic reagent. Suitable inorganic alkaline polysulfides are, for example, the alkaline disulfides, trisulfides, tetrasulfides, pentasulfides, and hexasulfides of cations such as sodium, potassium, or ammonium. Suitable inorganic hydrosulfides are those of sodium, potassium, cesium, lithium, and ammonium. Suitable multifunctional organic compounds for reaction therewith are, for example,

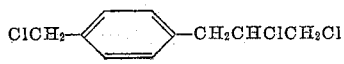

The carbon chains of the multifunctional compounds may also contain linking oxygen atoms. Examples of such materials are

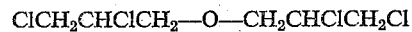
and
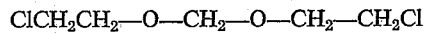

Though chloride has been shown as the group capable of splitting off in the presence of the alkaline polysulfide-hydrosulfide mixture, other halogens and other negative radicals, such as nitrate, sulfate, acid sulfate, carbonate, acetate, propionate and similarly acting groups, can also be used, as taught in the aforementioned patent.

When compounds such as those above, or mixtures of two or more of such compounds, are treated with an alkaline hydrosulfide-polysulfide mixture, the polysulfide acts to promote chain growth, either linear or crosslinked, or both, by a splitting off of the negatively-substituted groups in the organic materials. The hydrosulfide tends to introduce —SH groups into the organic materials by replacement of the negative radicals, and functions also to cleave chains formed by the alkaline polysulfide. Very complicated structures result from these reactions, especially where the organic compounds originally used have reactive functional groups in addition to those in a terminal position.

Depending on the ratio of alkaline polysulfide to alkaline hydrosulfide in the reaction mixture, the viscosity of the resulting product is variable. A high polysulfide to hydrosulfide ratio will result in a viscous product because of the predominance of the chain-forming inorganic alkaline polysulfide. When the chain-splitting inorganic alkaline hydrosulfide is present in a greater proportion, a less viscous material containing smaller polymer species will be the product. In molar proportions, the alkaline polysulfide and alkaline hydrosulfide, as taught in the patent, may vary between a 9 to 1 predominance of polysulfide to hydrosulfide, or a 9 to 1 ratio of alkaline hydrosulfide to alkaline polysulfide. For purposes of cable plugging, but not necessarily for other uses, an organic polysulfide resin with a viscosity at 25° C. not greater than 25 poises, and preferably of the order of 8 to 14 poises, is usually used.

An organic polysulfide suitable for use in forming gels, and, more particularly, for use in cable-plugging mixtures, may be prepared according to the technique of Patent No. 2,402,977 as follows. A 2 molar solution of sodium disulfide and a 2 molar solution of sodium hydrosulfide are mixed, 2000 cubic centimeters of the disulfide being used for 500 cubic centimeters of the hydrosulfide, with 50 cubic centimeters of water containing 25 grams of crystallized magnesium chloride. The mixture is heated with agitation to a temperature of 160° Fahrenheit, when 4 moles of dichlorodiethylformal are added dropwise over the space of an hour. The temperature of the mixture during this dropwise addition should be kept below 180° Fahrenheit. After all the organic material has been added, external heat should be applied to maintain the temperature at 180° Fahrenheit for about one additional hour. Agitation is then stopped and the resultant dispersion allowed to settle. The supernatant liquid is drawn off, and the residue washed several times by agitation with water, settling, and withdrawal of the wash fluid. The settled dispersion is acidified to a pH of about 6, then washed repeatedly with water as before. Acid treatment causes coagulation, producing a thick syrupy material, as described in Patent No. 2,402,977, as the final product. The structure of the product may be approximated by the formula

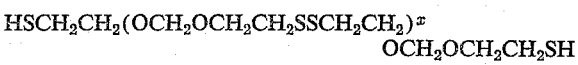

where $x$ is an integer such that the total molecular weight is approximately 1000.

A material even more suitable for the production of cable plugs is obtained by the inclusion of up to about 2 mole percent of trichloropropane with the dichlorodiethylformal used in making the polymer. Crosslinked structures and structures capable of crosslinking are thereby obtained. These structures are too complex to permit a simple representation by formula, but the characterized by additional —SH groups in other than terminal positions.

The polyepoxy compounds useful for forming gels and, specifically, for forming gels to be used as cable plugs are also known in the art, and their nature is described, for example, in United States Patent No. 2,506,486, issued May 2, 1950 to H. L. Bender, A. G. Farnham and J. W. Guyer. They are preferably either monomeric or partially polymerized forms of a diglycidyl ether of a diphenol, commonly prepared by reacting two or more molar proportions of epichlorhydrin with one molar proportion of a diphenol. The materials may be represented by the formula $$CH_2\!-\!\!-\!\!CH\!-\!CH_2\!-\!(O\!-\!R\!-\!O\!-\!CH_2\!-\!\underset{OH}{CH}\!-\!CH_2)_n\!-\!O\!-\!R\!-\!O\!-\!CH_2\!-\!CH\!-\!\!-\!\!CH_2$$
$$\diagdown\!O\!\diagup \qquad\qquad\qquad\qquad\qquad\qquad\qquad\qquad \diagdown\!O\!\diagup$$

where R is an aromatic-bearing radical which may vary considerably in nature, and $n$ is an integer sufficiently small that the material is a fluid. The value of $n$ will generally be less than about 9 and is preferably no greater than about 5.

Diphenols suitable for reacting with epichlorhydrin are, as taught in the aforementioned patent, No. 2,506,486, of the general formula

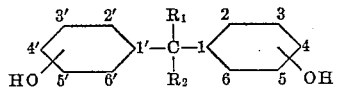

in which the phenolic hydroxy groups may be in the 2, 2'; 2, 3'; 2, 4'; 3, 3'; 3, 4'; and 4, 4' positions on the aromatic rings. The equivalence of positions 2 and 6, 2' and 6', or 3 and 5 and 3' and 5' is to be noted. $R_1$ and $R_2$ may, separately, be hydrogen, methyl, ethyl, propyl, isopropyl, butyl, isobutyl, pentyl, isopentyl, hexyl, isohexyl, a cyclohexyl, including the methyl, ethyl, propyl, butyl, pentyl and hexyl substituted cyclohexyls, or a phenyl, including the methyl, ethyl, propyl, butyl, pentyl and hexyl substituted phenyls. Those compounds in which $R_1$ and $R_2$, separately, contain up to 6 carbon atoms each are preferred. $R_1$ and $R_2$ taken together may be a cyclohexyl or a phenyl group, including the methyl, ethyl, propyl, butyl, isobutyl, pentyl, and hexyl substituted cyclohexyls or phenyls, such that the number of carbon atoms in $R_1$ and $R_2$ does not exceed twelve. When $R_1$ and $R_2$ separately or collectively are phenyl, the aromatic rings may contain fluorine or chlorine substituents, including the monofluorophenyls, the difluorophenyls, the trifluorophenyls, the chlorophenyls, the dichlorophenyls, the trichlorophenyls, and the fluorochlorophenyls.

Diphenols of the types mentioned above, when reacted with epichlorhydrin, will produce diglycidyl ethers of the general formula

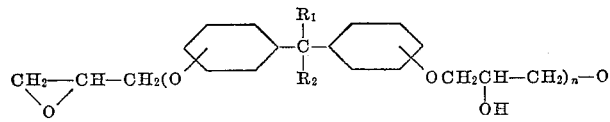

In the formula, $R_1$ and $R_2$ have the same significance as previously, and the epoxypropoxy groups are positioned as are the phenolic hydroxy groups in the parent diphenol. The value of $n$ is such as to give a fluid material and is preferably below about 5. Preparation of the diglycidyl ethers from epichlorhydrin and the diphenols proceeds in the presence of a basic or alkali-oxide, such as sodium hydroxide, as is known in the art and described in Patent No. 2,506,486 mentioned before.

Examples of the diglycidyl ethers of diphenols which are suitable follow. The formulas represent the epoxy compounds as monomers, for simplicity. It is to be understood that polymers of the materials are suitable for forming gels with polysulfides so long as the polymers retain sufficient fluidity to permit mixture with other reactants. For injection into a cable sheath, the fluidity of the epoxy compound at 25° C. should be such that the compound's viscosity does not exceed 150 poises and is preferably in the vicinity of 85 poises.

di(epoxypropoxyphenyl) methane

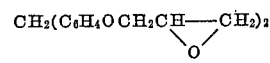

di(epoxypropoxyphenyl) methylmethane

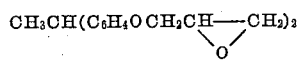

di(epoxypropoxyphenyl) dimethylmethane

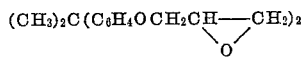

di(epoxypropoxyphenyl) phenylmethane

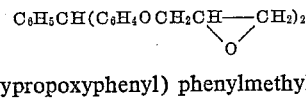

di(epoxypropoxyphenyl) phenylmethylmethane

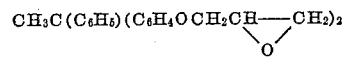

The 2, 2'; 2, 3'; 2, 4'; 3, 3'; 3, 4'; and 4, 4' isomers of the foregoing compounds are all suitable. Of particular usefulness in forming cable plugging mixtures to be activated by the catalysts here under consideration are the diglycidyl ethers of dihydroxydiphenyldiphenylmethanes, specifically the 4, 4' isomer of di(epoxypropoxyphenyl) diphenylmethane:

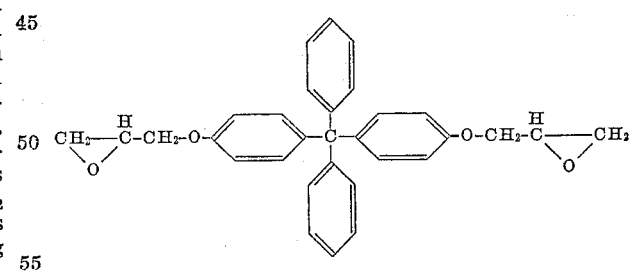

Mixtures of these above-described components, that is of the polyepoxide and polysulfide compounds, will react slowly in the absence of a catalyst, giving a soft gel within a period of several weeks. Inclusion of a catalyst, either an alkaline substance as previously used, or one of the catalysts at present under consideration, will accelerate the reaction so that the gelation time is reduced by an order of magnitude or more, and setting takes place in a day or less.

It is believed that the gelation reaction being catalyzed is a reaction between the glycidyl ether rings of the epoxy compound and hydrosulfide groups in the organic polysulfide. The best plugs are formed when these reactive groups are present in approximately equal numbers.

Consequently, the relative proportions by weight of the reactants should be varied to balance roughly the number of epoxy groups in the polyepoxy constituent with the number of mercapto groups in the polysulfide reactant. For example, when a diglycidyl compound and a dimercapto polysulfide are used in the plug-forming mixture, the reaction proceeds most satisfactorily when the reactants are present in weights proportional to their average molecular weights, or, identically, when present in substantially equimolar amounts. The condition of approximate equimolarity, taking into account possible variations in molecular weight of the compounds, will usually be satisfied when the ratio of polysulfide resin to polyepoxy compound, by weight, lies between 1.5 to 1 and 4 to 1, and preferably between 2 to 1 and 3 to 1.

The difference between the action of an alkaline catalyst and one of the new materials is made apparent by comparing the effect of each catalyst type on gel-forming mixtures in which one component is in large excess.

Use of either catalyst in mixtures in which polysulfide overwhelmingly predominates over the epoxy constituent will lead to the formation of thick elastic gels suspended in the excess polysulfide not reacted with the epoxy compound. Neither type of catalyst will effect further polymerization of the pure polysulfide.

However, if the epoxy compound is in great excess, different results are obtained with catalysts of the new type and the usual alkaline materials. Use of an alkaline catalyst will give, initially, a suspension of gel in the excess epoxy material. Further solidification follows more slowly, indicating a catalysis by basic materials of the polymerization of the initially unreacted, essentially pure, epoxy material. Using the catalysts of the present invention, the secondary reaction is not observed, and the suspension of gel in the excess epoxy component remains as a two-phase system. The new catalyst, not being alkaline in nature, has no tendency to polymerize pure epoxy material.

In the process devised for forming gas-tight resin plugs, it appears that the requirements for a fairly rapid gelation and also for a lasting toughness and flexibility tend, generally speaking, to be conflicting. Experiment shows that a thickening of the gel-forming mixture which takes place a short time after mixing tends to produce gas plugs which may harden and become brittle after aging has begun. Contrariwise, a slow gelation tends to give the rubbery cable plugs which are most favorable in mechanical properties.

A reasonable explanation of the phenomena observed correlates lack of plug flexibility with a high degree of crosslinking in the gel polymer. If gelation is rapid, heat evolved by the reaction encourages extensive crosslinking, resulting eventually in a less flexible plug. If the amount of catalyst present is such as to give only a moderate reaction rate, the heat generated by the slower reaction is dissipated as evolved, and crosslinking proceeds less extensively, giving more resilient polymer structures. The choice of catalyst and the fixing of its concentration in the mixture to be solidified are generally set by compromising the desires for a fairly rapid gel time and for a flexible plug retaining physical strength during long periods of aging.

Concentrations of the catalysts described above ranging between 0.1 percent by weight and 10 percent by weight of the combined mixture of catalyst and polyepoxy and polysulfide compounds are effective in forming gas-tight plugs which retain their good initial physical structure for long periods of time. Such concentrations of catalyst, still, produce a gelling of the liquid materials in a conveniently short reaction period. A more favorable result may be obtained if the catalyst concentration lies between 0.5 percent by weight and 5 percent by weight of the total reaction mixture. An optimum catalyst concentration appears between about 2 percent by weight to 3 percent by weight of catalyst.

The time required for gelation of the gel-forming mixtures using a given catalyst at a fixed concentration is inversely independent, though generally not linearly so, upon the temperature at which gelation takes place. Heat may be generated to a greater or lesser extent as the reaction proceeds, as described earlier. By fixing this variable by fixing the catalyst concentration, the mentioned inverse dependence of the gelation time on the essentially invariant ambient temperature is revealed. Since the mixtures may be used to form plugs in field operation at temperatures varying between about 40° Fahrenheit to about 100° Fahrenheit, the range of catalyst concentrations specified above has been made broad enough to include those concentrations required to give plug-forming reactions within 18 hours to 24 hours after mixing, even when the reaction is to occur at the more extreme temperatures to be expected in field operations. For lower temperatures of the environment, a high concentration of catalyst is indicated, and vice versa.

The following examples are offered as illustrative of the method of practicing the invention herein earlier described. The examples are illustrative only, and are not to be construed as limiting in any way the scope or spirit of the invention.

*Example 1*

An organic polysulfide polymer is produced by mixing 2.5 moles of sodium disulfide, as a 2 molar aqueous solution of sodium disulfide, with 2.5 moles of sodium hydrosulfide, as a 2 molar aqueous solution of sodium hydrosulfide. Twenty-five grams of crystallized magnesium chloride dissolved in 50 cubic centimeters of water are added to the mixture. The mixture is heated with agitation to a temperature of 160° Fahrenheit and 4 moles of dichlorodiethylformal are added dropwise over a period of one hour. The temperature of the mixture is not allowed to exceed 180° Fahrenheit. After all the organic material has been added, the mixture is kept for an additional hour at 180° Fahrenheit. The resulting dispersion is allowed to settle, the supernatant liquid is decanted, and the remaining dispersion washed repeatedly with water. The residium is then acidified to a pH of about 6 to coagulate the material, and then is rewashed repeatedly with water. Two parts by weight of the resulting polymer and one part by weight of a fluid polymer of di(epoxypropoxyphenyl) methane are mixed and 2.5 percent by weight of dipentamethylenethiuram tetrasulfide is added and stirred into the mixture. On standing in room temperature for 24 hours, the mixture thickens.

*Example 2*

Proceed as in Example 1 except that 2.5 percent by weight of benzothiazyl disulfide is added to catalyze the reaction mixture of organic polysulfide resin and polymerized diglycidyl ether.

*Example 3*

Using 0.5 moles of sodium disulfide as a 2 molar aqueous sodium disulfide solution, proceed as in Example 1 except that 3 moles of triglycol dichloride mixed with 0.5 moles of 1,2,3-trichloropropane are added as the organic material. Four parts by weight of the resulting organic polysulfide polymer and one part by weight of a liquid polymer of di(epoxypropoxyphenyl) phenylmethylmethane are mixed, and 5 percent by weight of an equimolar mixture of 2-mercaptothiazoline and lead dimethyldithiocarbamate is added to the reaction mixture to catalyze the gelation of the reactants.

*Example 4*

Using the same reactants as in Example 3, catalysis is accomplished with 5 percent by weight of a mixture containing equimolar amounts of 2-mercaptothiazoline and zinc dimethyldithiocarbamate.

Example 5

Using the same reactants as in Example 3, catalysis is accomplished with 5 percent by weight of a mixture containig equimolar amounts of 2-mercaptothiazoline and selenium diethyldithiocarbamate.

Example 6

Using the same reactants as in Example 3, catalysis is accomplished with 5 percent by weight of a mixture containing equimolar amounts of 2-mercaptothiazoline and the zinc salt of 2-mercaptobenzothiazole.

Example 7

Using the same reactants as in Example 3, catalysis is accomplished with 5 percent by weight of a mixture containing equimolar amounts of 2-mercaptothiazoline and the selenium salt of 2-mercaptobenzothiazole.

Example 8

Using the same reactants as in Example 3, catalysis is accomplished with 5 percent by weight of a mixture containing equimolar amounts of 2-mercaptothiazoline and the lead salt of 2-mercaptobenzothiazole.

Example 9

Proceed as in Example 3 except that 5 percent by weight of lead dimethyldithiocarbamate alone is used to catalyze the reactants.

Example 10

Prepare an organic polysulfide polymer by mixing 4.5 moles of sodium hydrosulfide, as a 2 molar aqueous sodium hydrosulfide solution, with 0.5 moles of sodium disulfide, as a 2 molar aqueous solution of the disulfide, adding magnesium chloride as before. To this mixture are added 2 moles of 1,2,3-trichloropropane in the manner of Example 1. Three parts by weight of the resulting polysulfide polymer and one part by weight of a fluid polymer of di(epoxypropoxyphenyl) phenyl methane are mixed and 4 percent by weight of zinc dimethyldithiocarbamate mixed with 4 percent by weight of the zinc salt of 2-mercaptobenzothiazole is added thereto to catalyze the gelation reaction.

Example 11

Proceed as in Example 10, except that the catalyst consists of 4 percent by weight of zinc dimethyldithiocarbamate mixed with 4 percent by weight of the lead salt of 2-mercaptobenzothiazole.

Example 12

Proceed as in Example 10, except that the catalyst consists of 4 percent by weight of zinc dimethyldithiocarbamate mixed with 4 percent by weight of the selenium salt of 2-mercaptobenzothiazole.

Example 13

Proceed as in Example 10, except that the catalyst consists of 4 percent by weight of zinc dimethyldithiocarbamate mixed with 4 percent by weight of lead dimethyldithiocarbamate.

Example 14

Proceed as in Example 10, except that the catalyst consists of 4 percent by weight of zinc dimethyldithiocarbamate mixed with 4 percent by weight of selenium diethyldithiocarbamate.

Example 15

Proceed as in Example 10 except that 6 percent by weight of only the zinc salt of 2-mercaptothiazoline is added to catalyze the gelation.

Example 16

Proceed as in Example 10, except that 6 percent by weight of the lead salt of 2-mercaptobenzothiazole is used as a catalyst.

Example 17

Proceed as in Example 10, except that 6 percent by weight of the selenium salt of 2-mercaptobenzothiazole is used as a catalyst.

Example 18

Proceed as in Example 10, except that 6 percent by weight of zinc diethyldithiocarbamate is used as a catalyst.

Example 19

Proceed as in Example 10, except that 6 percent by weight of selenium diethyldithiocarbamate is used as a catalyst.

Example 20

2.5 moles of sodium hydrosulfide, as a 2 molar aqueous sodium hydrosulfide solution, and 2.5 moles of 2 molar sodium disulfide, as a 2 molar aqueous solution, are mixed with magnesium chloride as in Example 1. 4 moles of dichlorodiethylformal containing 2 percent by weight of 1,2,3-trichloropropane are added dropwise, and the resulting polymer is treated as in Example 1. Two and one-half parts by weight of polymer are then mixed with one part by weight of a liquid polymer of 4,4'-di(epoxypropoxyphenyl) diphenyl methane. Four percent by weight of a mixture of four parts by weight of tetramethylthiuram disulfide with one part by weight of tetraethylthiuram disulfide is added and mixed with the reactants to catalyze the gelation reaction.

Example 21

Proceed as in Example 20, except that the catalyst is 4 percent by weight of a mixture of equal parts by weight of tetramethylthiuram disulfide and the zinc salt of 2-mercaptobenzothiazoline.

Example 22

Proceed as in Example 20, except that the catalyst is 4 percent by weight of a mixture of equal parts by weight of tetramethylthiuram disulfide and zinc dimethyldithiocarbamate.

Example 23

Proceed as in Example 20, except that the catalyst is 4 percent by weight of a mixture of equal parts by weight of tetramethylthiuram disulfide and the selenium salt of 2-mercaptobenzothiazole.

Example 24

Proceed as in Example 20, except that the catalyst is 4 percent by weight of a mixture of equal parts by weight of tetramethylthiuram disulfide and selenium diethyldithiocarbamate.

Example 25

Proceed as in Example 20, except that the catalyst is 4 percent by weight of a mixture of equal parts by weight of tetramethylthiuram disulfide and lead dimethyldithiocarbamate.

Example 26

Proceed as in Example 20, except that the catalyst is 4 percent by weight of a mixture of equal parts by weight of tetramethylthiuram disulfide and the lead salt of 2-mercaptobenzothiazole.

Example 27

As a preferred example, 20 parts by weight of a liquid organic polysulfide polymer prepared substantially as in Example 20, and available commercially from the Thiokol Corporation as "Thiokol LP3," are mixed with 6 parts by weight of partially polymerized fluid 4,4'-di(epoxypropoxyphenyl) diphenyl methane, available commercially as "Bakelite BRR18794" from the Bakelite Corporation. One part by weight of tetramethylthiuram disulfide is mixed together with the reactants and the mixture allowed to stand at approximately 25° C. After 20 hours, the mixture sets to a soft rubbery elastic gel slightly tacky on the exposed surface. After 64 hours, the surface is no longer tacky, but the other properties of the gel remained unchanged. After 18 months, the mechanical properties of the gel are essentially unchanged.

*Example 28*

Four parts of tetramethylthiuram disulfide and one part tetraethylthiuram disulfide are dissolved in a liquid organic polysulfide, prepared substantially as described in Example 20 to give a solution containing approximately 6 percent by weight of the mixed catalysts. Twenty-one parts of this solution are mixed with 6 parts of a fluid polymer of 4,4' - di(epoxypropoxyphenyl) diphenyl methane and allowed to stand till gelation.

*Example 29*

As a preferred example of the technique described in Example 28, 5.20 parts by weight of tetramethylthiuram disulfide and 1.3 parts by weight of tetraethylthiuram disulfide are dissolved in 100 parts by weight of a liquid organic polysulfide polymer prepared substantially as described in Example 10 and available commercially as "Thiokol LP3." To 21.3 parts by weight of the mixture are added 6 parts by weight of partially polymerized fluid 4,4'-di(epoxypropoxyphenyl) diphenyl methane, available commercially as "Bakelite BRR–18794." The components are thoroughly mixed and allowed to stand at about 25° C. After 5 hours, gelation occurs to give a soft rubbery gel with excellent tear resistance. After 18 months, these properties of the gel remain essentially unchanged.

*Example 30*

Proceed as in Example 28, except that the catalyst consists of a mixture of 4 parts by weight of benzothiazyl disulfide and one part by weight of 2-mercaptothiazoline.

*Example 31*

Proceed as in Example 28, except that the catalyst consists of a mixture of 4 parts by weight of benzothiazyl disulfide and one part by weight of dipentamethylenethiuram tetrasulfide.

What is claimed is:

1. The method of selectively catalyzing the copolymerization of a liquid polyepoxy compound, which is the product of the reaction between a diphenol and epichlorohydrin, and a liquid organic polysulfide polymer, formed by the polymerization of dichlorodiethylformal and trichloropropane in the presence of inorganic alkaline polysulfides and hydrosulfides, by use of at least one catalyst selected from the group consisting of thiuram sulfides, thiazyl sulfides and thio salts selected from the group consisting of metal thiuram and metal thiazyl salts wherein the said metal is selected from the group consisting of lead, selenium and zinc, and wherein said metal is attached to the said salt through a sulfur linkage, comprising mixing together the said polyepoxy compound, the said polysulfide polymer and the said catalyst in amounts such that there is present a substantially equal number of reactive epoxy groups and reactive hydrosulfide groups, the said catalyst being present in an amount of between 0.1 percent by weight and 10 percent by weight of the mixture, whereby a non-fluid gel results.

2. The method of claim 1 in which the said catalyst is tetramethylthiuram disulfide.

3. The method of claim 1 in which the liquid polyepoxy resin has the structure

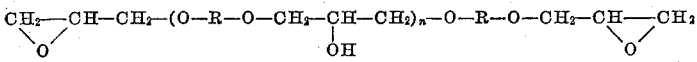

where $n$ is an integer of up to 5 and R is an arylene radical.

References Cited in the file of this patent

UNITED STATES PATENTS

| | | |
|---|---|---|
| 2,126,818 | Sager et al. | Aug. 16, 1938 |
| 2,611,930 | Hill et al. | Sept. 30, 1952 |
| 2,632,211 | Trigg | Mar. 24, 1953 |
| 2,668,805 | Greenlee | Feb. 9, 1954 |
| 2,731,437 | Bender et al. | Jan. 17, 1956 |
| 2,792,441 | Platow | May 14, 1957 |

OTHER REFERENCES

The Van Nostrand Chemist's Dictionary, Van Nostrand Corp., N. Y. (1953), page 44.

Jorczak et al.: "Liquid Polymers Combined With Epoxy Resins," India Rubber World, April 1954, pages 66–69.

Marmion: "Epoxide Resins," Research (London), volume 7, 1954, pages 351–355.

"VA–3 as Curing Agent for GR–S and Buna N Rubbers," bulletin VA–3 (No. 2), published by Thiokol Corp., Jan. 29, 1945, page 1.